United States Patent [19]

Miller

[11] Patent Number: 4,522,980

[45] Date of Patent: Jun. 11, 1985

[54] IMPACT MODIFIED COPOLYESTER CARBONATE COMPOSITIONS

[75] Inventor: Kenneth F. Miller, Mt. Vernon, Ind.

[73] Assignee: General Electric Company, Mt. Vernon, Ind.

[21] Appl. No.: 452,909

[22] Filed: Dec. 27, 1982

[51] Int. Cl.³ .............................................. C08L 69/00
[52] U.S. Cl. ...................................... 525/67; 525/146; 525/148; 525/902
[58] Field of Search ................ 525/146, 148, 67, 902; 524/508

[56] References Cited

U.S. PATENT DOCUMENTS

| | | | |
|---|---|---|---|
| 3,169,121 | 2/1965 | Goldberg | 524/108 |
| 4,226,950 | 10/1980 | Holub et al. | 525/146 |
| 4,340,683 | 7/1982 | Liu | 525/146 |
| 4,401,785 | 8/1983 | Liu et al. | 525/146 |

FOREIGN PATENT DOCUMENTS

| | | | |
|---|---|---|---|
| 3300856 | 8/1983 | Fed. Rep. of Germany . | |
| 55-43137 | 3/1980 | Japan . | |
| 56152 | 4/1980 | Japan | 525/146 |
| 55-50059 | 4/1980 | Japan . | |
| 55-52345 | 4/1980 | Japan . | |
| 55-090550 | 7/1980 | Japan | 525/146 |
| WO82/02401 | 7/1982 | PCT Int'l Appl. . | |
| WO83/01255 | 4/1983 | PCT Int'l Appl. . | |

OTHER PUBLICATIONS

Research Disclosure 217, May 1982.

*Primary Examiner*—Theodore E. Pertilla
*Attorney, Agent, or Firm*—Martin B. Barancik

[57] ABSTRACT

A composition useful for improving impact strength of an aromatic copolyester carbonate having isophthalate units comprising the said aromatic copolyester carbonate and impact modifier useful in impact modifying aromatic polycarbonate.

5 Claims, No Drawings

IMPACT MODIFIED COPOLYESTER CARBONATE COMPOSITIONS

BACKGROUND OF THE INVENTION

Copolyester carbonates are known thermoplastic materials which, due to their many advantageous properties, find use as thermoplastic engineering materials. The copolyester carbonates exhibit, for example, excellent properties of toughness, flexibility and high heat distortion temperures.

In comparison to aromatic polycarbonates, aromatic copolyester carbonates provide increased Distortion Temperature Under Load, however there is a decrease in the value of certain other properties. Perhaps one of the major differences is in the impact properties for aromatic copolyester carbonate. Impact strength in thin section, ⅛ inch, is significantly reduced in comparison to aromatic polycarbonate. Additionally, a brittle failure mode accompanies the break.

It has now been discovered that various impact modifiers useful in positively modifying the impact properties of aromatic polycarbonate are also useful in upgrading the impact properties of certain aromatic copolyester carbonates while leaving essentially unimproved the impact properties of closely structurally related aromatic copolyester carbonates.

SUMMARY OF THE INVENTION

In accordance with the invention there is a composition comprising in admixture
  a. an aromatic copolyester carbonate composition comprising a polymer derived from
    i. a dihydric phenol,
    ii. a carbonate precursor, and
    iii. a further composition providing isophthalate units to the said aromatic copolyester carbonate composition, wherein the further composition can not supply more than 25% terephthalate units to the total ester units of the said aromatic copolyester carbonate; and
  b. an impact modifier composition comprising an impact modifier which improves the impact properties of aromatic polycarbonate, said impact modifier composition present in quantities which improves the impact properties of the said aromatic copolyester carbonate composition.

The usual impact modifiers employed for upgrading the impact properties of aromatic polycarbonate have been found to leave essentially unmodified the impact properties of aromatic copolyester carbonates whose ester content is provided by large quantities of terephthalate units. However these same impact modifiers bring about significant upgrading of aromatic copolyester carbonate compositions whose ester content is provided by large quantities of isophthalate units.

DETAILED DESCRIPTION OF THE INVENTION

The dihydric phenols useful in preparing the aromatic copolyester carbonates which are used in the practice of this invention are in general represented by the formula

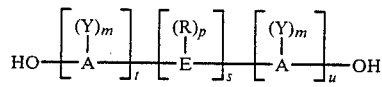

wherein A represents an aromatic group such as phenylene, biphenylene, naphthylene, etc. E may be an alkylene or alkylidene group such as methylene, ethylene, propylene, propylidene, isopropylidene, butylene, butylidene, isobutylidene, amylene, isoamylene, amylidene, isoamylidene, etc. Where E is an alkylene or alkylidene group, it may also consist of two or more akylene or alkylidene groups connected by a non-alkylene or non-alkylidene group such as an aromatic linkage, a tertiary amino linkage, an ether linkage, a carbonyl linkage, a silicon-containing linkage, or by a sulfur-containing linkage such as sulfide, sulfoxide, sulfone, etc. In addition, E may be a cycloaliphatic group (e.g., cyclopentyl, cyclohexyl, etc.); a sulfur containing linkage, such as sulfide, sulfoxide or sulfone; an ether linkage; a carbonyl group; a tertiary nitrogen group; or a silicon-containing linkage such as silane or siloxy. R represents hydrogen or a monovalent hydrocarbon group such as alkyl (methyl, ethyl, propyl, etc.), aryl (phenyl, naphthyl, etc.), aralkyl (benzyl, ethylphenyl, etc.), alkaryl, or cycloaliphatic (cyclopentyl, cyclohexyl, etc.). Y may be an inorganic atom such as halogen (fluorine, bromine, chlorine, iodine), an inorganic group such as the nitro group, a group such as R above, or an oxy group such as OR, it being only necessary that Y be inert to and unaffected by the reactants and reaction conditions. The letter m represents any integer from and including zero through the number of positions on A available for substitution; p represents an integer from and including zero through the number of positions on E available for substitution; t represents an integer equal to at least one; s is either zero or one; and u represents any integer including zero.

In the dihydric phenol compound represented by Formula I above, when more than one Y substituent is present, they may be the same of different. The same hold true for the R substituent. Where s is zero in Formula I and u is not zero, the aromatic rings are directly joined with no intervening alkylene or other bridge. The positions of the hydroxyl groups and Y on The aromatic nuclear residues A can be varied in the ortho, meta, or para positions and the groupings can be in vicinal, asymmetrical or symmetrical relationship, where two or more ring carbon atoms of the hydrocarbon residue are substituted with Y and hydroxyl groups.

Some nonlimiting examples of dihydric phenols falling within the scope of Formula I include:
2,2-bis(4-hydroxyphenyl)propane (bisphenol A);
2,4'-dihydroxydiphenylmethane;
bis(2-hydroxyphenyl)methane;
bis(4-hydroxyphenyl)methane;
bis(4-hydroxy-5-nitrophenyl)methane;
bis(4-hydroxy-2,6-dimethyl-3-methoxyphenyl)methane;
1,1-bis(4-hydroxyphenyl)ethane;
1,1-bis(4-hydroxy-2-chlorophenyl)ethane;
2,2-bis(3-phenyl-4-hydroxyphenyl)propane;
bis(4-hydroxyphenyl)cyclohexylmethane; and
2,2-bis(4-hydroxyphenyl)-1-phenylpropane.

These dihydric phenols may be used alone or as mixtures of two or more different dihydric phenols.

The carbonate precursor may be a carbonyl halide, a carbonate ester or a haloformate. The carbonyl halides which can be employed herein are carbonyl chloride, carbonyl bromide and mixtures thereof. Typical of carbonate esters which may be employed herein are diphenyl carbonate, di(halophenyl) carbonates such as di(chlorophenyl)carbonate, di(bromophenyl)carbonate, di(trichlorophenyl)carbonate, di(tribromophenyl)carbonate, etc.; di(alkylphenyl) carbonates such as di(toly)carbonate, etc., di(naphthyl)carbonate, di(chloronaphthyl)carbonate, phenyl tolyl carbonate, chlorophenyl chloronaphthyl carbonate, etc., or mixtures thereof. The haloformates suitable for use herein include bishaloformates of dihydric phenols (bischloroformates of hydroquinone, etc.) or glycols (bishaloformates of ethylene glycol, neopentyl glycol, polyethylene glycol, etc.). Carbonyl chloride, also known as phosgene, is preferred.

Also present during the co-reaction between the dihydric phenol, the carbonate precursor and the dicarboxylic acid or its reactive derivative are catalysts, molecular weight regulators, and acid acceptors. Examples of suitable molecular weight regulators include phenol, p-tertiary butyl phenol, etc. Examples of suitable catalysts include tertiary amines, quaternary ammonium compounds, quaternary acceptors include teritary amines, alkali or alkaline earth metal hydroxides, etc.

In general isophthalic acid or its reactive derivatives conventionally used in the preparation of polyesters may be used for the preparation of copolyester carbonates useful in this invention. Of the reactive derivatives, the acid halides are preferred, the acid chloride being most preferred. The phenyl moiety of the isophthaloyl may be substituted with any group which is inert to the reaction medium and provides the suitable impact properties. Examples of such substituents are alkyl and alkoxy, generally of from one to about six carbon atoms inclusive, the phenyl ring bearing from one to three of these substituents. However it is preferred to have the phenyl ring unsubstituted. Although all isophthalate ester linkages are preferred in the aromatic copolyester carbonate, up to about 25% preferably up to about 15% of the ester linkages may be terephthalate, these linkages being derived from terephthalic acid or terephthalic acid halides such as terephthalic acid chloride. In preparing the aromatic copolyester carbonate mixtures of the isophthalic and terephthalic acid chlorides can be employed.

The aromatic copolyester carbonates in general have from about 25 to about 90 mole percent ester bonds, preferably about 35 to about 80 mole percent ester bonds. If five moles of bisphenol A react completely with four moles of isophthalic acid chloride and one mole of phosgene, an aromatic copolyester carbonate having eighty mole percent ester bonds is prepared.

The aromatic copolyester carbonates can be prepared by any of the usual well known procedures, for example melt polymerization or interfacial polymerization Examples of procedures are in U.S. Pat. Nos. 3,169,121; 3,030,331; 4,194,038; 4,156,069; 4,238,596 and 4,238,597 all of which are incorporated by reference.

Any material known to impact modify aromatic polycarbonate, particularly polycarbonate derived from bisphenol A, should be useful in upgrading the impact properties of the aromatic copolyester carbonate of this invention. Examples of these impact modifiers include but are not limited to the following general categories:

polyacrylates
polyolefins
rubbery dienic polymers
styrenic polymers

The polyacrylates which can be employed as impact modifiers are rubbery homopolymers or copolymers. In general the polyalkyl acrylates described in Brinkmann et al., U.S. Pat. No. 3,591,659 incorporated by reference, can be used, especially those containing units derived from alkyl acrylates, particularly n-butyl acrylate. Acrylate containing copolymers wherein the other monomer is, for example, derived from a methacrylate are also readily employable, see for example Japanese Patent Application Announcement 1968-18611, incorporated by reference. Preferably the acrylate resin will be in the form of a rubber-elastic graft copolymer having a glass transition temperature below about $-20°$ C., preferably below about $-40°$ C. Schlichting, U.S. Pat. No. 4,022,748, incorporated by reference. More preferably, the acrylate resin will comprise a multiple stage polymer having a rubbery first stage (core) and a thermoplastic hard final stage (shell), see Farnham U.S. Pat. No. 4,096,202, incorporated by reference.

The most preferred acrylate resin is a multiphase composite interpolymer comprised of a $C_{1-5}$ acrylate and a $C_{1-5}$ methacrylate. These interpolymers consist of about 25 to 95 weight percent of a first elastomeric phase polymerized from a monomer system comprising about 75 to 99.8 weight percent of a $C_{1-5}$ alkyl acrylate, 0.1 to 5 percent by weight cross linking monomer, 0.1 to 5 percent by weight of graftlinking monomer, and about 75 to 5 weight percent of a final rigid thermoplastic phase polymerized in the presence of said elastomeric phase.

The crosslinking monomer is a polyethylenically unsaturated monomer having a plurality of addition polymerizable reactive groups all of which polymerize at substantially the same rate of reaction. Suitable crosslinking monomers include polyacrylic and polymethacrylic esters of polyols such as butylene diacrylate and dimethacrylate, trimethylol propane trimethacrylate, and the like; di- and trivinyl benzene, vinyl acrylate and methacrylate, and the like. The preferred crosslinking monomer is butylene diacrylate.

The graftlinking monomer is a polyethylenically unsaturated monomer having a plurality of addition polymerizable reactive groups, at least one of which polymerizing at substantially different rates of polymerization from at least one other of said reactive groups. The function of the graftlinking monomer is to provide a residual level of unsaturation in the elastomeric phase, particularly in the latter stages of polymerization and, consequently, at or near the surface of the elastomer particles.

When the rigid thermoplastic phase is subsequently polymerized at the surface of the elastomer, the residual unsaturated addition polymerizable reactive group contributed by the graftlinking monomer participates in the subsequent reaction so that at least a portion of the rigid phase is chemically attached to surface of the elastomer. Among the effective graftlinking monomers are alkyl group-containing monomers of alkyl esters of ethylenically unsaturated acids such as allyl acrylate, allyl methacrylate, diallyl maleate, diallyl fumarate, and allyl acid itaconate. Somewhat less preferred are the diallyl esters of polycarboxylic acids which do not contain polymerizable unsaturation. The preferred graftlinking monomers are allyl methacrylate and diallyl maleate.

A most preferred interpolymer has only two stages, the first stage comprising about 60 to 95 percent by weight of the interpolymer and being polymerized from a monomer system comprising 95 to 99.8 percent by weight butyl acrylate, 0.1 to 2.5 percent by weight butylene diacrylate as crosslinking agent, 0.1 to 2.5 percent by weight allyl methacrylate or diallyl maleate as a graftlinking agent, with a final stage polymerized from about 60 to 100 percent by weight methyl methacrylate, butyl acrylate, 0.1 to 2.5 percent by weight butylene diacrylate as crosslinking agent, 0.1 to 2.5 percent by weight allyl methacrylate or diallyl maleate as a graftlinking agent, with a final stage polymerized from about 60 to 100 percent by weight methyl methacrylate. The multiphase composite interpolymer Acryloid KM-330 available from Rohm and Haas is preferred. This interpolymer is comprised of small quantities of cross linking and graft linking monomers, about 80 weight percent n-butyl acrylate and about 20 weight percent methyl methacrylate.

The polyolefins which can be employed as impact modifiers are homopolymers or copolymers. Examples of the homopolymers include polyethylene, polypropylene, polybutene 1, polyhexene and the like. The polymers include the standard high density polymers, low density polymers as well as the newer linear low density polyolefins such as the linear low density polyethylene made with butene-1 or octene-1. Other examples of copolymers containing at least one olefin monomer can be employed. For example copolymers of ethylene and propylene can be employed as the impact modifier as well as a copolymer of an olefin and an acrylate such as ethylene ethyl acrylate, a copolymer available from Union Carbide as DPD-6169. Other higher olefin monomers can be employed as copolymers with alkyl acrylates, for example propylene and n-butyl acrylate and the like. These polyolefins polymers can also be reacted with rubbery dienes so as to form terpolymers of the EPDM family such as ethylene propylene diene terpolymers, for example Epsyn 704 available from Copolymer Rubber.

Various rubbery polymers can also be employed as impact modifiers. Examples of such rubbery polymers include polybutadiene, polyisoprene, styrene-butadiene and various other copolymers having a rubbery dienic comonomer.

Styrene containing polymers can also be employed as impact modifiers for aromatic polycarbonates. Examples of such polymers include acrylonitrile-butadiene-styrene, styrene acrylonitrile, acrylonitrile-butadiene-α-methylstyrene, methacrylate-butadiene-styrene and other high impact styrenic containing polymers.

Other known impact modifiers include various elastomeric materials such as, organic silicone rubbers, organic silicone polysiloxane polymers, elastomeric fluorohydrocarbons, elastomeric polyesters and the like.

Any minimum quantity of impact modifier which positively upgrades the impact strength of the aromatic copolyester carbonate can be employed. Greater than this minimum quantity can be employed as long as the properties desired for a particular application of the aromatic copolyester carbonate are substantially maintained. Generally, a minimum of about two weight percent is sufficient to observe an increase. A minimum of about four weight percent is preferred. A level of about fifteen weight percent should generally not be exceeded, preferably about ten weight percent. Weight percent is measured as the amount of impact modifier in the total of impact modifier plus aromatic copolyester carbonate.

The composition of the invention may be compounded in the usual manner, for example blending the aromatic copolyester carbonate with the impact modifier in dry form, for example powder or granules and the like and then extruding the composition.

The composition may also contain admixed therewith the commonly known and used additives such as antioxidants, antistatic agents, glass fibers, fillers such as mica, talc and the like, colorants, ultra violet radiation stabilizers, hydrolytic stabilizers and flame retardants. Particularly useful flame retardants are the alkali and alkaline earth salts of sulfonic acids, particularly aromatic and perfluoro alkyl sulfonic acids, see for example U.S. Pat. Nos. 3,933,734; 3,931,100; 3,978,024; 3,948,851; 3,926,908; 3,919,167; 3,909,490; 3,953,396; 3,953,399; 3,917;559; 3,951,910 and 3940,366.

The following examples are illustrative of the invention and are not used to narrow the broad inventive concept.

Comparative Example 1

To a reactor fitted with a mechanical agitator were charged 10 liters of deionized water, 16 liters of methylene chloride, 1,910 grams (8.36 moles) of bisphenol-A, 24 milliters of triethylamine, 3.4 grams of sodium gluconate and 65 grams (0.43 mole) of para-tertiarybutyl phenol. This reaction mixture was stirred and to the stirred reaction mixture were added over a 15 minute period a mixture of 926 grams of terephthaloyl dichloride and 163 grams of isophthaloyl dichloride as a 25 weight % solids solution in methylene chloride. During the acid chloride addition the pH was maintained in the range of 8.5–11.5 by the addition of NaOH. After all the diacid chloride was added, phosgene was introduced at the rate of 36 grams per minute for 15 minutes with the pH controlled at 9.5 to 12 by the addition of aqueous sodium hydroxide solution. After phosgenation was terminated, 6 liters of methylene chloride were added, the brine layer separated by centrifuge, and the resin solution washed with aqueous acid and twice with water. The resin was steam precipitated and dried in a nitrogen fluid bed drier at approximately 240° F.

The aromatic copolyester carbonate compositions were formed by adding the specific impact modifier and tumble mixing. This resin mixture was then fed to an extruder operating at a temperature of about 600° F. to extrude the resin into strands and the strands are chopped into pellets. The pellets are then injection molded at about 620°–650° F. into test samples measuring about $2\frac{1}{2}'' \times \frac{1}{2}'' \times \frac{1}{8}''$ or $\frac{1}{4}''$. These chips were then tested for their impact strength under ASTM D256.

The composition has a 63 mole percent ester content and is 85:15 terephthalate to isophthalate.

All weight percentages are based on weight percent impact modifier plus aromatic copolyester carbonate. The superscript refers to percent ductility at break. The Notched Izod value is in foot-lbs/inch of notch. Below are the results.

TABLE I

| Example | % Copolyester carbonate | % Impact Modifier | Notched Izod $\frac{1}{8}''$ | $\frac{1}{4}''$ |
|---|---|---|---|---|
| Control | 100 | 0 | 6.0° | 5.7° |
| A | 96 | 4.0$^a$ | 7.5° | 5.5° |
| B | 96.2 | 3.8$^b$ | 6.5° | 5.8° |

TABLE I-continued

| Example | % Copolyester carbonate | % Impact Modifier | Notched Izod ⅛" | ¼" |
|---|---|---|---|---|
| C | 96.2 | 3.8[b] | 6.7° | 5.5° |

[a] an acrylate resin, Acryloid KM330 obtained from Rohm and Haas.
[b] a polyolefin, a linear low density polyethylene LPX-12 obtained from Exxon.
[c] a polyolefin, a linear low density polyethylene LPX-1 from Exxon.

As is observed from the data, impact modifiers useful in modifying bisphenol A polycarbonate do not bring about any significant increase in impact strength in an aromatic copolyester carbonate having a substantial amount of terephthalate units. The foot lb value is not significantly increased and the failure mode remains brittle.

Example

To a reactor fitted with a mechanical agitator were charged 32 liters of deionized water, 65 liters of methylene chloride, 7.6 Kg (33.4 moles) of bisphenol-A, 100 milliters of triethylamine, 17 grams of sodium gluconate and 125 g (0.83 mole) of para-tertiarybutyl phenol. This reaction mixture was stirred and to the stirred reaction mixture were added over a 10 minute period 5.08 Kg (25 moles) of isophthaloyl dichloride as a 30% solids solution in methylene chloride. During the acid chloride addition the pH was maintained in the range of 9-10 by the addition of 25% aqueous sodium hydroxide. The resulting mixture was phosgenated by the introduction of phosgene at the rate of 120 grams per minute for about 15 minutes with the pH controlled at 10 to 12 by the addition of aqueous sodium hydroxide solution. After phosgenation was terminated 10 liters of methylene chloride were added, the brine layer was separated by centrifuge, and the resin solution washed with aqueous acid and twice with water. The resin was steam precipitated and dried in a nitrogen fluid bed drier at approximately 240° F. The impact modifier was then tumble mixed with the aromatic copolyester carbonate. This resin mixture was then fed to an extruder operating at a temperature of about 600° F. to extrude the resin into strands and the strands are chopped into pellets. The pellets are then injection molded at about 620° F. into test samples measuring about 2½"×1½"×⅛" or ¼". The following formulations were tested in the manner stated previously. Below are the results.

The composition has a 74 mole percent ester content. The ester content is totally isophthalate units.

Below are the results.

TABLE II

| Example | % Copolyester carbonate | % Impact Modifier | Notched Izod ⅛" | ¼" |
|---|---|---|---|---|
| Control | 100 | 0 | 9.3° | 2.4° |
| 1 | 96 | 4[d] | 9.7[100] | 7.6[20] |
| 2 | 96 | 4[e] | 9.3[100] | 6.2° |
| 3 | 96 | 4[f] | 8.5[60] | 6.6[20] |
| 4 | 96 | 4[g] | 9.8[100] | 6.5° |
| 5 | 96 | 4[h] | 8.1[80] | 6.6° |

[d] 75 weight percent of an acrylate, Acryloid KM330 and 25 weight percent of an olefin acrylate copolymer ethylene-ethyl acrylate 4.5:1 on a weight basis obtained from Union Carbide as DPD6169.
[e] an acrylate resin, Acryloid KM330
[f] an olefin acrylate DPD-6169, previously described in [d] above.
[g] a polyolefin, a linear low density polyethylene LPX-1 from Exxon.
[h] a polyolefin, a linear low density polyethylene LPX-15 obtained from Exxon.

As is observed from the data, impact modifiers useful in modifying bisphenol A polycarbonate bring about a significant increase in impact strength in an aromatic copolyester carbonate having isophthalate as the ester unit. With respect to the ⅛" Izod values, there is now a more ductile failure mode. In three out of five examples a completely ductile failure mode occurs. The unmodified aromatic copolyester carbonate composition failure mode is completely brittle.

In the ¼" test system, the failure mode remains substantially brittle; however the impact value in foot-lbs is substantially increased. It should be noted that the impact modifier and quantity thereof is substantially the same in examples A and 2 and examples C and 4. It is clear that significant impact modification occurs when the aromatic copolyester carbonate of the invention is employed with impact modifiers known to increase the impact properties of bisphenol A polycarbonate.

What is claimed is:
1. A composition comprising in admixture
   a. an aromatic copolyester carbonate composition comprising a polymer derived from
      i. a dihydric phenol,
      ii. a carbonate precursor, and
      iii. a further composition providing isophthalate units to the said aromatic copolyestercarbonate composition, wherein the further composition cannot supply more than 25% terephthalate units to the total ester units of the said aromatic copolyestercarbonate which has from about 25 to about 90 mole percent ester bonds; and
   b. an impact modifier comprising a polyacrylate or an olefin comonomer and polyacrylate which improves the impact properties of aromatic polycarbonates, said impact modifier composition present in quantities which improves the impact properties of the said aromatic copolyestercarbonate, said quantities from about 2 to about 15 weight percent of the impact modifier plus aromatic copolyestercarbonate.
2. The composition in accordance with claim 1 wherein the impact modifier is a polyacrylate.
3. The composition in accordance with claim 2 wherein the impact modifier is a polyacrylate multiphase composite interpolymer comprising n-butylacrylate and methylmethacrylate.
4. The composition in accordance with claim 1 wherein the impact modifier is in a range of from about 4 to about 10 weight percent.
5. The composition in accordance with claim 1 wherein the impact modifier is an ethylene ethylacrylate copolymer.

* * * * *